United States Patent [19]

Cusdin et al.

[11] Patent Number: 4,797,679

[45] Date of Patent: Jan. 10, 1989

[54] RADIO DIRECTION-FINDING USING TIME OF ARRIVAL MEASUREMENTS

[75] Inventors: Anthony R. Cusdin, Horley; Alan F. Dadds, Hartfield; Peter Mallinson, Redhill, all of England

[73] Assignee: U. S. Philips Corporation, New York, N.Y.

[21] Appl. No.: 59,730

[22] Filed: Jun. 9, 1987

[30] Foreign Application Priority Data

Jun. 10, 1986 [GB] United Kingdom ............... 8614107
Jun. 10, 1986 [GB] United Kingdom ............... 8614108

[51] Int. Cl.⁴ .................................................. G01S 1/24
[52] U.S. Cl. ..................................... 342/387; 342/394
[58] Field of Search ............... 342/424, 442, 375, 446, 342/387, 388, 389, 394

[56] References Cited

U.S. PATENT DOCUMENTS

| | | | |
|---|---|---|---|
| 3,936,831 | 2/1976 | Jones | 342/444 |
| 4,136,342 | 1/1979 | Alcock et al. | |
| 4,170,774 | 10/1979 | Schaefer | |
| 4,466,067 | 8/1984 | Fontana | 364/460 |
| 4,638,320 | 1/1987 | Eggert et al. | 342/442 |

Primary Examiner—Theodore M. Blum
Attorney, Agent, or Firm—Marianne R. Rich

[57] ABSTRACT

A method and a system for radio direction-finding by measuring the Time of Arrival (ToA) of the leading edge of signals from a distant source at two relatively closely spaced receiving elements. In order to give a good degree of immunity to multipath, the times at which the instantaneous detected amplitudes of the received signals first exceed a minimal threshold value such that received signals can be satisfactorily distinguished from noise is measured in such a manner that the measured time is not affected by multipath which involves more than a few meters additional path length for the indirect, delayed signal. A suitable timing circuit is disclosed.

By making ToA measurements on three coplanar, non-collinear receivers, directions of incidence in three dimensions can be determined.

A method and a system using both ToA and phase-difference measurements can provide the accuracy of interferometry but be simpler and cheaper.

29 Claims, 5 Drawing Sheets

RADIO DIRECTION-FINDING USING TIME OF ARRIVAL MEASUREMENTS

The invention relates to a method and to a system for determining the direction of incidence of electromagnetic wave signals from a distant source by determining the difference between the time of arrival (ToA) of the leading edge of wave signals received respectively from the source at the two elements of at least one pair of mutually-spaced wave-receiving elements.

The invention further relates to a method and to a system for determining the direction of incidence of electromagnetic wave signals from a distant source using both ToA and phase-difference measurements.

The invention further relates to a timing circuit for measuring time with a high resolution, for example one nanosecond.

ToA (also known as Time Difference of Arrival, TDOA) direction-finding (DF) with a long baseline, i.e. wherein the wave-receiving elements are spaced miles apart, is known from, for example, the article "Passive Direction Finding and Signal Location" by A. R. Baron et al, Microwave Journal, September 1982, pages 59–76: see particularly page 59 and pages 66–70. A major disadvantage of ToA DF using a long baseline in many practical situations is that if, as is normally the case, the direction of incidence is to be determined over a substantial range of directions, there is a substantial interval of time over which signals from the same source may arrive at one wave-receiving element of the pair relative to the other, the difference between the ToAs depending on the position of the source relative to the pair of elements. If there is a plurality of sources from which signals may be received, for example sources emitting pulsed signals with a substantial pulse repetition frequency (PRF), then there is a significant probability that the signals whose ToAs at the two elements are compared come from different sources rather than the same source; the greater the spacing between the elements, and consequently the longer the above-mentioned period, the greater is the probability. It is then necessary to compare one or more characteristic parameters of the signals received at the two elements, for example frequency, PRF or pulse length, to ascertain whether they come from the same or different sources. Not only does this require substantial further equipment, but it substantially increases the time taken to ascertain the direction of incidence of the signals.

ToA DF using a short baseline, for example 24 feet, is known from U.S. Pat. No 3,936,831. The use of a short baseline has the advantage (although there is no mention of it in the U.S. patent) that the above-mentioned interval within which signals from the same source can arrive at the two elements is so small that there is a high probability in practical situations that signals from a different source will not arrive in that period. However, the use of a short baseline imposes the difficulty of determining time differences of the order of tens of nanoseconds or less. The above-mentioned U.S. patent proposes a system wherein a capacitor is charged at a fast, linear rate from a constant-current source, charging being started by the arrival of a pulse signal at one element and stopped by the arrival of a pulse signal at the other element; the time difference is then effectively multiplied by transferring the voltage on the capacitor to a further capacitor which is discharged at a much slower constant rate. However, the circuitry disclosed for performing these functions would not in practice be suitable for the very short time differences involved. For example, the current from the constant-current source could not be switched between zero and its full value in a time which is short compared with the time difference involved. Moreover, FIG. 5 of the U.S. patent, which is a graph of a count representative of the measured time difference against time delay (actual time difference), shows a predominantly substantially rectilinear variation from about 2000 nanoseconds down to about 150 nanoseconds; at this point, there is an abrupt change of slope, with what appears to be a hypothetical extrapolation to the origin of the graph. This indicates that the circuit would not in fact operate as intended for the time differences of 0–50 nanoseconds that would actually need to be measured.

It is an object of the invention to provide an improved method and system for short-baseline ToA DF. It is a further object of the invention to provide an improved timing circuit.

According to a first aspect of the invention, a method of determining the direction of incidence of electromagnetic wave signals from a distant source from the time of arrival of the leading edge of the wave signals comprises:

receiving said signals at a plurality of mutually spaced wave-receiving elements, detecting the respective instantaneous amplitude of the signal received at each element, measuring the times at which the detected amplitudes of wave signals received respectively at at least two of said elements first exceed a minimal threshold value such that signals can be satisfactorily distinguished from noise and which is substantially less than the minimum peak value of signals whose direction of incidence is to be determined by said method, the time being measured in such a manner that the measured time is generally unaffected by multipath propagation, determining the difference between the measured times in respect of one pair or of a plurality of pairs of said elements, wherein the two elements of said one pair or of each of at least two of said plurality of pairs are sufficiently close together that the length of the interval of time within which signals from the same source must arrive at the two elements is so short that there is a high probability in operation that no signals from another source will arrive in that interval, and deriving a representation of the direction of incidence from the time difference(s) utilising the relationship $$\cos \alpha = c\delta t/d$$

where $\alpha$ is the angle between the direction of incidence of the signals and the line joining the two elements of a said pair, d is the distance between those two elements, $\delta t$ is the time difference in respect of that pair of elements, and c is the free-space velocity of electromagnetic waves.

According to a second aspect of the invention, a system for determining the direction of incidence of electromagnetic wave signals from a distant source from the time of arrival of the leading edge of the wave signals, comprises:

a plurality of mutually spaced wave-receiving elements, means for detecting the respective instantaneous amplitude of the signal received at each element, means for measuring the times at which the detected amplitudes of wave signals received respectively at at least two of said elements first exceed a minimal threshold value such that signals can be satisfactorily distinguished from noise and which is substantially less than the minimum peak value of signals whose direction of incidence is to be determined by said method, the time being measured in such a manner that the measured time is generally unaffected by multipath propagation, means for determining the difference between the measured times in respect of one pair or of a plurality of pairs of said elements, wherein the two elements of said one pair or of each of at least two of said plurality of pairs are sufficiently close together that the length of the interval of time within which signals from the same source must arrive at the two elements is so short that there is a high probability in operation that no signals from another source will arrive in that interval, and means for deriving a representation of the direction of incidence from the time difference(s) utilising the relationship $$\cos \alpha = c\delta t / d$$

where $\alpha$ is the angle between the direction of incidence of the signals and the line joining the two elements of a said pair, d is the distance between those two elements, $\delta t$ is the time difference in respect of that pair of elements, and c is the free-space velocity of electromagnetic waves.

These aspects of the invention involve the recognition that in contrast to other methods and systems for direction-finding such as interferometry, ToA DF can provide a good degree of immunity to multipath propagation, provided that the time of arrival is measured early on the leading edge of the signal and in such a manner that the measured time is not substantially affected by multipath propagation which involves more than a short additional path length for the indirect, delayed signal. If the ToA is not measured early on the leading edge of a signal, multipath can significantly distort the shape of the leading edge as the signal approaches its peak value, leading to a substantial error in a measured time difference and hence in the derived direction of incidence. As will be described below, the ToA may be measured in respect of a threshold which is well below the minimum peak amplitude and in such a manner that the measured time is unaffected by variations in signal amplitude within a period of, for example, not more than about 10 nanoseconds after the threshold is first exceeded, so that the system is immune to multipath propagation which involves more than about three meters additional path length, as will generally be the case for a distant source.

The above-mentioned U.S. patent pays particular attention to attempting to eliminate the effects of pulse amplitude on ToA measurement by using a so-called Normalizer, but makes no reference to the possible effects of multipath. In the first of two Normalizer processes described with reference to FIG. 7 of the patent, the value of the signal amplitude at which the signal is timed is dependent on the rate of increase of the amplitude, and since this value would necessarily have to be at a minimal threshold for satisfactory distinction of received signals from noise when the rate of increase is at its lowest acceptable value, the amplitude value at which the signal is timed will generally be above the minimal threshold value and hence not as early on the leading edge as it might be. In the second Normalizer process described with reference to FIG. 8 of the patent, a second threshold well above a first threshold is used. The Normalizer processes are therefore inherently more susceptible to multipath which affects the shape of the leading edge of the signal. Moreover, in view of the relatively slow-acting circuitry described in the patent, the Normalizers would necessarily require the timed point on a pulse to be well after the start of the pulse. The present invention involves the recognition that in practice, it is more desirable to obviate the effect of most multipath propagation: timing errors due to multipath will generally be worse than errors due to different signal amplitudes. Moreover, by making the ToA measurement early on the leading edge, inaccuracies due to different signal amplitudes may in any case be reduced.

Owing to the difficulty of measuring very short time differences accurately, there is in practice likely to be a significant uncertainty in the difference between measured ToAs, and therefore ToA DF with a short baseline is likely not to be very accurate, although a single ToA difference measurement can give an unambiguous indication of direction.

Better accuracy is achievable with interferometers. Direction-finding using interferometers is well known. The difference in phase between signals received respectively from a distant source at two mutually spaced wave-receiving elements is representative of the angle between the direction of incidence of the signals and the line joining the two elements. The greater the spacing between the elements, the more accurately the angle of incidence can be determined, but the smaller is the unambiguous range of directions of incidence. To resolve ambiguity, a rectilinear array of wave-receiving elements is used to provide a series of pairs of elements with progressively smaller spacings; the widest-spaced pair provides an accurate but ambiguous representation, and the closest-spaced pair provides a coarse but unambiguous representation. With successive spacings in a suitable ratio, the ambiguity in the phase measurement on the widest-spaced pair can be resolved by reference to the successively more closely-spaced pairs of the series. However, to provide good accuracy may require a substantial amount of equipment since each element is associated with a respective receiver, and with N elements, at least (N−1) phase discriminators are needed. Such a system may consequently be expensive.

It is also well known to determine the direction of incidence of radio waves by comparing the amplitudes of the signals received by two adjacent similar antennae whose respective main-beam axes are inclined to one another. If the direction of incidence lies between the axes, the ratio of the amplitudes is representative of the angle between the direction of incidence and either of the axes. This arrangement provides an unambiguous but relatively inaccurate measurement of direction.

According to a third aspect of the invention, a method of determining the direction of incidence of electromagnetic wave signals from a distant source comprises:

receiving said signals at each of a plurality of mutually spaced wave-receiving elements, measuring the phase difference between the signals received respectively at the two elements of one pair of said elements or the respective phase differences between the signals received respectively at the two elements of each of a plurality of substantially collinear pairs of said elements with different respective spacings, wherein the phase measurement on said one pair or on the closest-spaced of said pairs is ambiguous in the operating range of directions of incidence and the operating frequency range, determining by a method embodying the first aspect of the invention the approximate direction of incidence of said signals from the times of arrival of the leading edges of corresponding wave signals received respectively at two of said plurality of elements, the line joining which two elements is parallel to and substantially coincident with the line joining said one pair or said plurality of substantially collinear pairs, wherein the range of possible values of the actual time difference due to the uncertainty in the difference between the measured times corresponds to a range of angles of incidence whose magnitude is not greater than the magnitude of the range of angles of incidence corresponding to the unambiguous range of phase difference measurement on said one pair or said closest-spaced pair, and resolving the ambiguity in said ambiguous phase measurement by comparing the possible directions represented thereby with the approximate direction determined from the difference between the measured times.

According to a fourth aspect of the invention, a system for determining the direction of incidence of electromagnetic wave signals from a distant source comprises:

a plurality of mutually spaced wave-receiving elements, means for measuring the phase difference between the signals received respectively at the two elements of one pair of said elements or the respective phase differences between the signals received respectively at the two elements of each of a plurality of substantially collinear pairs of said elements with different respective spacings, wherein the phase measurement on said one pair or on the closest-spaced of said pairs is ambiguous in the operating range of directions of incidence and the operating frequency range, means, comprising a system embodying the second aspect of the invention, for determining the approximate direction of incidence of said signals from the times of arrival of the leading edges of corresponding signals received respectively at two of said plurality of elements, the line joining which two elements is parallel to and substantially coincident with the line joining said one pair or said plurality of substantially collinear pairs, wherein the range of possible values of the actual time difference due to the uncertainty in the difference between the measured times corresponds to a range of angles of incidence whose magnitude is not greater than the magnitude of the range of angles of incidence corresponding to the unambiguous range of phase difference measurement on said one pair or said closest-spaced pair, and means for resolving the ambiguity in said ambiguous phase measurement by comparing the possible directions represented thereby with the approximate direction determined from the difference between the measured times.

By using a ToA DF arrangement to resolve ambiguity in the phase measurement on the single pair or the closest-spaced pair of elements of an interferometer DF arrangement, the need for one or more interferometer channels which would merely be needed for resolving ambiguity but which would not increase the accuracy of the direction-finding is avoided, and the combined arrangements may be cheaper and simpler than a purely interferometric one.

To determine directions of incidence over a wide range of directions, particularly directions which are not restricted substantially to a plane including the elements, a system embodying the fourth aspect of the invention may comprise phase-difference measuring means, approximate-direction-determing means and ambiguity-resolving means operable in respect of a first pair or a first plurality of substantially collinear pairs of the elements and of a second pair or a second plurality of substantially collinear pairs of the elements to derive first and second unambiguous phase measurements, wherein the line joining the elements of said first pair or said first plurality of pairs and the line joining the elements of said second pair or said second plurality of pairs are substantially coplanar and inclined to one another, said first and second phase measurements being representative of the angle $\alpha$ between the direction of incidence and the line joining the elements of the respective pair(s), and further comprising means for deriving a representation of the angle $\theta$ and/or a representation of the angle $\beta$, where $\theta$ is the angle between the direction of incidence projected into the plane of the lines and the normal to a respective one of said line in said plane and where $\beta$ is the angle between the direction of incidence and said plane, from the first and second unambiguous phase measurements utilising the relationship $$\sin (90 \text{ degrees} - \alpha) = \sin \theta \cos \beta.$$

For simplicity, said lines may be mutually perpendicular.

In a particularly simple system, the approximate-direction-determining means may be operable in respect of the times of arrival at a common element and at each of two elements respectively on the two lines, and furthermore the phase-difference measuring means may be operable to measure the phase differences between said common element and each of two elements respectively on the two lines.

As an alternative, a system may comprise three or more mutually inclined successively adjacent pairs or plurality of pairs of elements, means for measuring the amplitude of wave signals received at one or more elements of each of said three or more pairs or plurality of pairs, and means for selecting as said first pair or plurality of pairs one of said three or more pairs or plurality of pairs in respect of which the amplitude is at least as great as the amplitude in respect of each of the remaining pairs or plurality of pairs and as said second pair or plurality of pairs a pair or plurality of pairs adjacent said first pair or plurality of pairs in respect of which the amplitude is at least as great as the amplitude in respect of any other adjacent pair or plurality of pairs. Suitably, such a system comprises four mutually orthogonal pairs or plurality of pairs of elements.

A method embodying the first aspect of the invention may involve using three substantially coplanar but substantially non-collinear elements to form at least two said pairs, and deriving a representation of the angle $\theta$ and/or a representation of the angle $\beta$ utilising the relationship $$\sin (90 - \alpha) = \sin \theta \cos \beta$$

in respect of each of said at least two pairs, wherein θ is the angle between the direction of incidence projected into the plane of the three elements and the normal in said plane to the line joining the two elements of a said pair, and β is the angle between the direction of incidence and said plane. Directions of incidence in three dimensions may thus be determined from ToA measurements at three elements.

The method may further comprise determining a parameter representative of the rate of increase of the detected amplitude of the respective signal received at at least one of the elements in the region of said threshold value, and determining the direction of incidence of received signals only if said parameter satifies a criterion representing a minimum rate of increase in said region. Signals whose direction of incidence cannot be determined with satisfactory accuracy can thereby be discarded. Such a method may comprise measuring the time at which the detected amplitude first exceeds an adjacent further threshold value, wherein said parameter is the difference between the measured times in respect of the two threshold values, and wherein said criterion is that said parameter does not exceed a maximum value. Alternatively, such a method may comprise differentiating the increasing detected amplitude at least in said region, wherein said parameter is the rate of increase in detected amplitude derived by differentiation, and wherein said criterion is that said parameter exceeds a minimum value.

A system embodying the second aspect of the invention may comprise means for performing optional features of a method embodying the first aspect of the invention, as set forth in claims 7 to 10.

According to a fifth aspect of the invention, a timing circuit comprising a clock pulse generator, a tapped delay device having a plurality of n mutually spaced taps, a latch coupled to the delay device for latching any signal on each of the n taps, and a decoding device coupled to the latch for producing a time representation from the signal(s) latched from the n taps, is characterised in that an input signal to be timed is coupled to the input of the delay device, in that the clock pulse generator is normally operable to clock the latch, in that the circuit comprises inhibiting means responsive to the presence of a signal on at least one of the n taps when the latch is clocked to inhibit further clocking of the latch, and in that the decoding device is operable to produce a representation of the interval between the time that said input signal reaches the tap nearest the input of the delay device and the preceding clock pulse.

Said interval may be represented as zero for the case in which the input signal has reached the tap furthest from the input when the latch is clocked, and other intervals represented accordingly.

A timing circuit embodying the third aspect of the invention may be contrasted with the timing circuit disclosed in GB No. 2 132 043 A and EP No. 113 935 A, in which the clock pulse generator is coupled to the input of the delay line, and the input signal to be timed is used to latch the latch.

Suitably, the circuit further comprises a counter for counting the pulses of the clock pulse generator, wherein the inhibiting means are further operable to inhibit further counting of the clock pulses, the outputs of the decoding device and the counter being concatenated.

In order to be able to produce representations of intervals over the majority of the period of the clock pulse generator, the period of the clock pulse generator may be not substantially less than the time delay between the tap nearest to and the tap furthest from the input of the delay device. Suitably, said period is substantially equal to said time delay.

To make good use of the delay device and to provide representations of integral multiples of a fraction of the period of the clock pulse generator, the time delay between each adjacent pair of the n taps may be the same, being equal to T, and the period of the clock pulse generator be nT.

Where the circuit is to be used to time the beginning of signals which persist for at least the period of the clock pulse generator, the inhibiting means may be responsive to the presence of a signal on the tap nearest the input of the delay device when the latch is clocked. This helps to distinguish true signals to be timed from noise in the case where a signal is present on a tap beyond the tap nearest the input of the delay device when the latch is clocked, since such a signal might be due to noise. As a further safeguard against false measurements due for example to noise, the decoding device may be operable not to produce said time representation unless when the latch is clocked a signal is present on each of the n taps between the input of the delay device and the tap furthest from the input of the delay device on which a signal is present.

It has been found that attempting to operate a timing circuit of the kind disclosed in the above-mentioned GB and EP published applications to measure time to a resolution of about 1 nanosecond produces difficulties in synchronising the fine count produced by the decoding device and the coarse count produced by the counter. A timing circuit embodying the third aspect of the present invention can be both simpler and more reliable. Furthermore, it has been found advantageous to use the threshold crossing merely to feed an input signal to the delay device, rather than to use it to control gates: the latter is liable in practice to produce undesired distortion of the signal.

Embodiments of the invention will now be described, by way of example, with reference to the diagrammatic drawings, in which.

Figure 1:
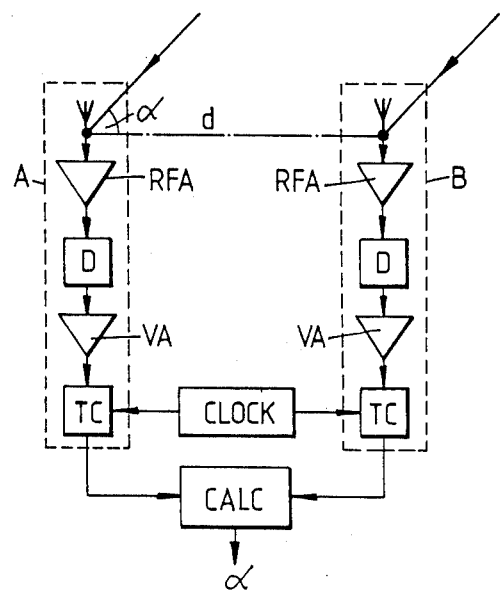
FIG. 1 is a block diagram of a ToA DF system embodying the invention and comprising one pair of wave-receiving elements.

FIG. 1 shows a simple system comprising one pair of wave-receiving elements. The system comprises two similar channels A and B respectively. Each of the channels comprises in succession an antenna ANT, an RF amplifier RFA, a detector D, a video amplifier VA, and a timing circuit TC. The antennae may be omnidirectional, or may be directional with their axes substantially parallel. The spacing d between the antennae is chosen to be sufficiently small that the length of the interval of time within which signals from the same source must arrive at the two elements is so short that there is a high probability in operation that no signals from another source will arrive in that interval. If signals may be received from any direction, the length of the interval is twice the time taken for electromagnetic waves to travel the distance d (in free space): the limits of this interval are set by the possibility of signals being incident along the line joining the antennae in one sense or the other, i.e. from left or right in FIG. 1. The probability of no signals arriving from another source in that interval will depend on the number of sources from which signals can be received, the frequency with which they emit fresh signals, and the duration of the signals. What probability is sufficiently high will depend on what proportion of incorrect representations of direction, due to measurements having been made in the two channels on signals from different sources, is considered acceptable. For typical operational situations of the number of sources emitting pulsed signals, their PRF and pulse length, a separation d of the order of 50 feet, giving an interval length of about 100 nanoseconds, is considered to give an acceptably high probability. When an RF signal is incident on the antenna of one of the channels, the RF signal is amplified and detected, and the time at which the instantaneous detected amplitude of the signal, after further amplification, first exceeds a threshold value is measured. This threshold value is chosen to be substantially less than the minimum peak value of signals whose direction of incidence is to be determined, as will be explained in greater detail below; the threshold will usually be much less than the typical peak value. The timing circuits operate with a common clock (CLOCK). A calculating unit CALC determines the difference δt between the measured times and provides therefrom a representation of the direction of incidence, for example of the angle α between the incident signals and the line joining the antennae, utilising the relationship $$\cos \alpha = c\delta t/d$$

where c is the free-space velocity of electromagnetic waves.

The time at which the threshold value is first exceeded is measured in each timing circuit TC in such a manner that the measured time is unaffected by multipath propagation where the delayed signal has been reflected from a surface not virtually coincident with the direct path between a distant source and the antenna.

Figure 2:
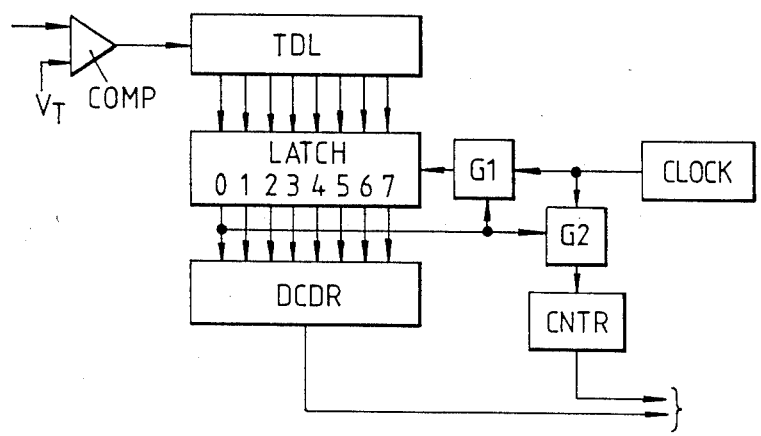
FIG. 2 is a block diagram of a timing circuit embodying the invention suitable for use in a ToA DF system embodying the invention.

An ECL (emitter-coupled logic) circuit arrangement, suitable for the timing circuit TC of FIG. 1 and capable of measuring to an accuracy of 1 nanosecond, is shown in FIG. 2. The detected and amplified video signal from the video amplifier VA is applied to a very fast comparator COMP whose output changes from a logic "0" to "1" when the input signal exceeds a threshold voltage $V_T$. The comparator output signal is fed to the input of a tapped delay line TDL having 8 consecutive taps separated by 1 nanosecond intervals. The taps are connected to respective inputs of an 8-bit latch LATCH. The latch is clocked at 8 nanosecond intervals by a 125 MHz clock CLOCK via a gate G1, the clock signal also being supplied via a further gate G2 to a synchronous counter CNTR which provides a coarse measurement of time. The outputs, labelled 0–7, of the latch are fed to a decoding circuit DCDR; the presence of a signal on at least one output, in this case the first output, 0, is also used to control the gates G1 and G2, the output being connected thereto by a fast feedback loop. The outputs of the counter CNTR and the decoder DCDR are concatenated to give a representation of the time at which the output of the comparator COMP changed from 0 to 1.

In operation, the gates G1 and G2 are normally open. The counter CNTR measures time in 8-nanosecond units, up to a maximum time at least as long as the above-mentioned interval, determined by the antenna spacing d, within which signals from a distant source must be received by both antennae. The latch is similarly clocked at 8-nanosecond intervals, but while the comparator output is 0, there are no signals from the tapped delay line, and the latch outputs remain at zero. When the comparator output changes to 1 (which in the case of a true received signal as opposed to noise will normally persist for longer than the period of the clock), the signal travels along the delay line changing successive tap outputs from 0 to 1. When the latch is next clocked, the series of ones and remaining zeroes is held in the latch. The presence of a "1" on the first output, 0, of the latch closes the gates G1 and G2, preventing further clocking of the latch and the counter. The output of the latch will be one of the following codes:

```
10000000

11000000

11100000

11110000

11111000

11111100

11111110

11111111
```

The first of these codes represents the most recent ToA and the last the earliest ToA since the latch was last clocked; the first indicates that 7 nanoseconds should be added to the time represented by the counter CNTR while the last requires zero addition. The decoder DCDR transforms that latch output to binary digits which are concatenated with the counter output.

The threshold the crossing of which is timed is, as previously explained, set at a low value in order largely to avoid errors due to multipath. Setting the threshold at a level substantially below the minimum peak level of signals whose direction of incidence is to be determined, for example 10 dB below the minimum peak level, also provides the advantage of tending to alleviate timing errors which would occur if the signal amplitude crossed the threshold at a slow rate because the amplitude were reaching its peak level. The lowest level at which the threshold can be set will depend on the noise level in the system: if the threshold is set too close to the noise level, the accuracy of timing will be degraded by the random fluctuation in the amplitude of desired signal plus noise, and a positive-going threshold crossing may even be caused by noise alone.

The decoder is in this embodiment arranged to accept only the above-mentioned codes. It consequently accepts only signals whose amplitude remains above threshold long enough to produce a continuous succession of ones in the latch, and rejects any other pattern of zeros and ones which might result from triggering of the comparator by noise spikes or from a received signal with a slow rate of increase of amplitude.

It will be seen that provided the amplitude remains above threshold long enough for this state to be latched, the measurement of ToA will be unaffected by subsequent variations in amplitude, in particular variations due to a delayed multipath signal which arrives in phase opposition to the original direct-path signal and causes the amplitude to fall below threshold. The maximum period taken to latch the above-threshold state is in this embodiment the length of the delay line, i.e. 8 nanoseconds. This time may be much shorter than the time taken for the amplitude to reach typical peak value.

A delay not less than and substantially equal to the time taken for electromagnetic waves to travel the distance d may be included in one channel before the timing circuit so that time differences are measured with respect to the time of arrival of a signal in the other channel. Suitably, a time "window" is used to prevent unnecessary computation on time differences which are too large for the signals to have come from the same source. Where the above-mentioned delay is included in one channel, this window may be defined as beginning with a time difference of zero and ending with a time difference not less than and substantially equal to twice the time taken for electromagnetic waves to travel the distance d. The use of a time window also provides some protection against random noise signals which cause the detected amplitude to exceed the threshold from causing false measurements.

At least one, and preferably each, of the channels in the system of FIG. 1 may comprise a signal validating circuit (not shown) to ascertain the rate of increase of the amplitude of the signal in that channel in the region of the threshold value, and to cause the system not to determine the direction of incidence unless the rate satisfies a criterion of minimum slope. For this purpose, the output of the video amplifier VA may be supplied to a further timing circuit (not shown) which measures the time at which the signal amplitude first exceeds an adjacent further threshold value. The difference between the times measured by the two circuits in a channel may be determined, and the direction of incidence determined only if the difference does not exceed a maximum value.

Alternatively, the amplitude increase may be differentiated and the direction of incidence determined only if the rate of increase of amplitude derived by differentiation exceeds a minimum value.

As a further way of distinguishing signals coming from a distant source from noise, at least one of the channels may comprise means (not shown) for determining the peak amplitude of a signal which causes the threshold to be exceeded, and for inhibiting the determination of the direction of incidence unless the peak amplitude is substantially greater than the threshold.

It is considered that a suitable criterion of minimum slope may be that the steepness of the rising edge should be predominantly controlled by the video bandwidth of the system. This inter alia has the effect of reducing the dependence of the measured time on the rate of increase of the RF amplitude and hence tends to achieve the same object as the Normalizers in the above-mentioned U.S. patent. It may be desirable for the video bandwidth to be switchable between a broadband value and a narrowband value. The broadband value may allow more accurate iiming of steeply-rising leading edges, but the narrowband value may enable acceptable results to be obtained with more slowly-rising edges, since it may reduce the noise level in the video circuit and allow the threshold to be set to a lower value and hence to a relatively steeper part of the leading edge.

Figure 3:
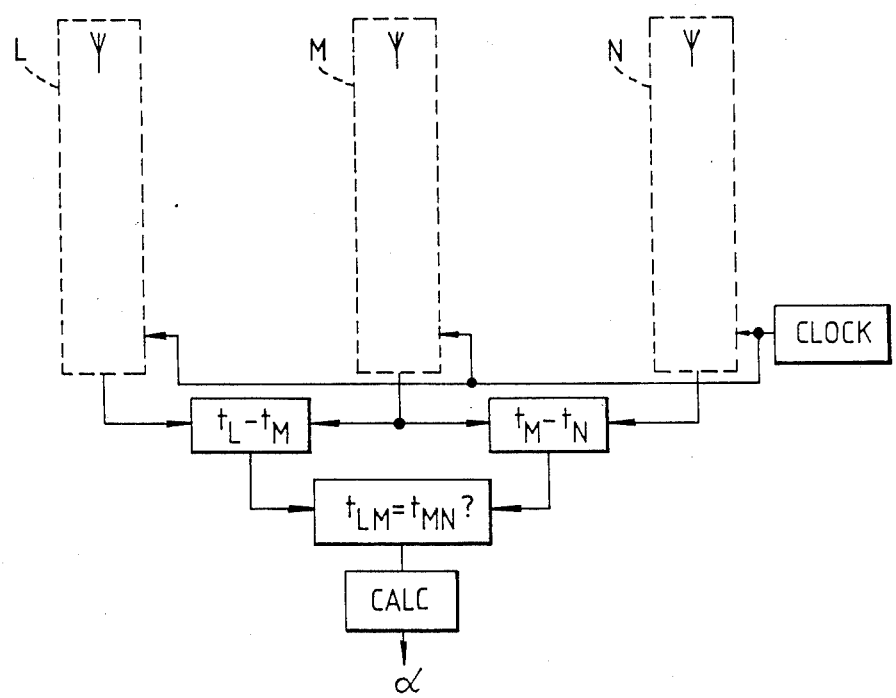
FIG. 3 is a block diagram of a ToA DF system embodying the invention and comprising three collinear wave-receiving elements.

FIG. 3 depicts a modification of the system of FIG. 1 comprising three coplanar and collinearly disposed antennae L, M, N respectively in respective channels each as each of the channels shown in FIG. 1. The spacings of each of the two pairs of elements LM and MN are equal (each being d) and each satisfy the above-mentioned criterion that the spacing is sufficiently small that the length of the interval of time within which signals from the same source must arrive at the two elements of a pair is so short that there is a high probability in operation that no signals will arrive from another source in that interval; the spacing 2d between antennae L and N may however be too large to satisfy this criterion. Nevertheless, the difference between the times of arrival of signals at antennae L and N may be used to provide a more accurate representation of the direction of incidence than could be provided by the system of FIG. 1 if one or more steps are taken to reduce the possibility that the time difference measured on one of the pairs of antennae LM, MN does not relate to the same source as the time difference measured on the other pair. For example, as indicated in FIG. 3, the time differences measured in relation to each pair of antennae, $t_{LM}$ and $t_{MN}$ respectively, may be compared, and only if their values are equal to within a small tolerance is the direction of incidence determined from the difference between the times of arrival at antennae L and N; the probability that signals from different sources should result in substantially equal time differences being measured between the elements of the pairs LM and MN is small, and even if the signals should have come from different sources, the resultant error in the indicated direction of incidence in relation to the source from which signals were first received at one pair of antennae will be small.

Figure 4:
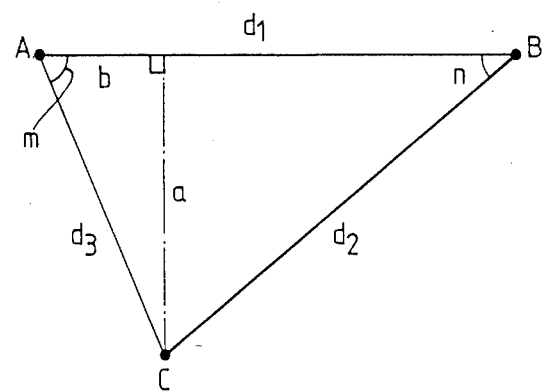
FIG. 4 illustrates the disposition of three non-collinear wave-receiving elements for an omnidirectional ToA DF system embodying the invention.

The systems so far described provide only a representation of the direction of incidence that defines an angle to the line joining a pair of wave-receiving elements, and hence the surface of a cone whose axis is said line. Where sources are known to lie substantially in a single plane including said line and where the wave-receiving elements are directional, this may be sufficient (although it should be borne in mind that the accuracy with which $\alpha$ can be determined decreases as $\alpha$ decreases from 90 degrees to 0; however, when signals may be received from each side of said line, and particularly when sources are not restricted to a single plane, it is desirable to peform measurements on at least one further wave-receiving element which is not collinear with the one pair of elements. FIG. 4 depicts the deposition of three substantially coplanar but not collinear elements A, B, C respectively, forming an arbitrarily-shaped triangle. The spacings AB, BC, CA each satisfy the above-mentioned criterion of being sufficiently small. By measuring the times of arrival of signals at each element, the direction of incidence may be determined for the general case of distant sources in 3-dimensional space as follows.

Let the spacings AB, BC, CA be $d_1$, $d_2$, $d_3$ respectively. Let the angles CAB and ABC be m and n respectively. Let the length of the perpendicular from C onto AB be a, and the distance from A to the intersection of said perpendicular with AB be b, so that $a = d_3 \sin m$ and $b = d_3 \cos m$. (Thus b is negative if m>90 degrees.) Let the angle between the direction of incidence and the normal to AB in the plane of AB and the direction of incidence be $\gamma$ (so that $\gamma = (90\ degrees - \alpha)$ and $\cos \alpha = \sin \gamma$), the angle between the normal to AB in the plane of ABC and the direction of incidence projected into that plane be $\delta$ (typically the azimuth angle), and the angle between the direction of incidence and the plane of ABC be $\beta$ (typically the elevation angle). Let the times of arrival at A, B, C be $t_A$, $t_B$, $t_C$ respectively.

Then $\sin \gamma = c(t_A - t_B)/d_1$

Now $\sin \gamma = \sin \theta \cos \beta$

Writing
$x = c(t_A - t_B)/d_1$
$y = c(t_A - t_C)/d_3$
$z = c(t_B - t_C)/d_2$, we may put
$x = \sin \theta \cos \beta$ and analogously
$y = \sin (\theta - m) \cos \beta$
$z = \sin [\theta - (180 - n)] \cos \beta$
$= -\sin (\theta + n) \cos \beta$.

Eliminating $\beta$ from either of two pairs of these equations, one obtains $\tan \theta = x \sin m / [x \cos m - y]$ and $\tan \theta = -x \sin n / [x \cos n + z]$.

These expressions have two-fold ambiguity. To distinguish between $-90$ degrees $< \theta < 90$ degrees and 90 degrees $< \theta < 270$ degrees, one may note that the denominator of for example the first expression for $\tan \theta$ may be expanded as $\sin \theta \cos \beta \cos m - \sin(\theta - m) \cos \beta$ or $\cos \beta \cos \theta \sin m$.

Thus the denominator is positive for $-90$ degrees $< \theta < 90$ degrees and negative for 90 degrees $< \theta < 270$ degrees.

Re-writing the first expression for $\tan \theta$ in terms of the times of arrival and multiplying the numerator and denominator by $d_1 d_3$, $$\tan \theta = (t_A - t_B)d_3 \sin m / [(t_A - t_B)d_3 \cos m - (t_A - t_C)d_1]$$
$$= -a(t_A - t_B)/[d_1(t_A - t_C) - b(t_A - t_B)]$$
$$= -a(t_A - t_B)/[(d_1 - b)(t_A - t_C) + b(t_B - t_C)].$$

Writing $P = a(t_A - t_B)$ $Q = (d_1 - b)(t_A - t_C)$ $R = b(t_B - t_C)$, one obtains $\tan \theta = -P/(Q + R)$ or $\theta = -\text{Arc tan}[P/(Q + R)]$.

Figure 5:
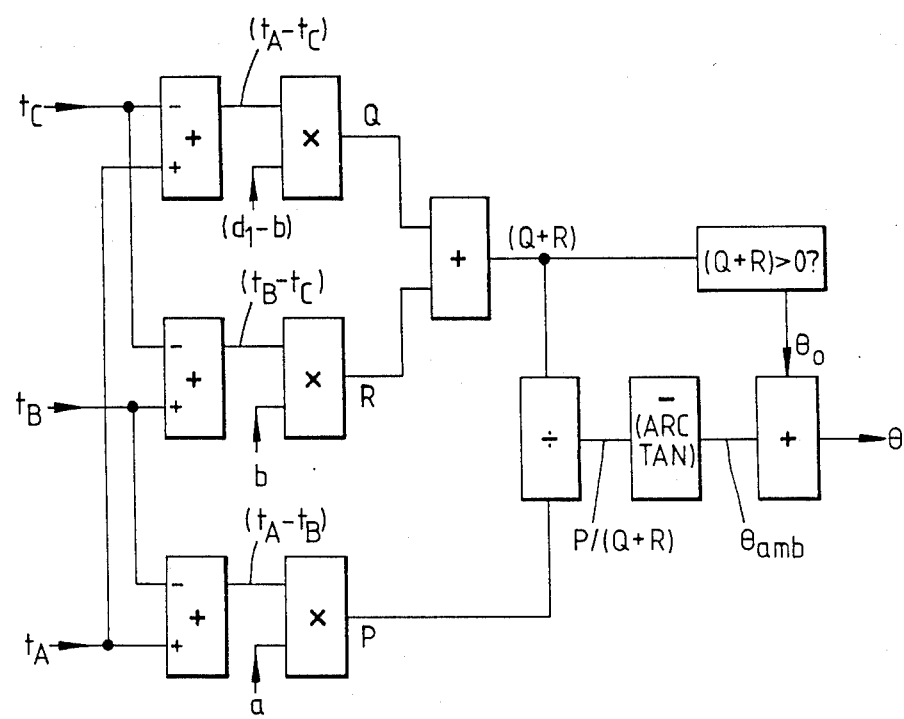
FIG. 5 illustrates schematically processing to calculate an angle using the elements of FIG. 4.

FIG. 5 illustrates schematically the processing to calculate $\theta$ according to this expression. The differences $t_A - t_B$, $t_B - t_C$, $t_A - t_C$ are formed from the measured times $t_A$, $t_B$, $t_C$ and then scaled to produce the quantities P, Q, R. The quantities Q and R are summed and divided into P; the angle whose tangent is equal to minus the quotient is then determined, for example from a look-up table in a PROM, to obtain an ambiguous value $\theta_{amb}$ of $\theta$. The sign of (Q+R) is also checked; if (Q+R)>0, a quantity $\theta_o = 180$ degrees is produced, otherwise $\theta_o = 0$. $\theta_{amb}$ and $\theta_o$ are summed to produce an unambiguous value of $\theta$. Having calculated $\theta$, the angle $\beta$ may be calculated by substituting $\theta$ in, for example, the expression $x = \sin \theta \cos \beta$.

Alternatively, $\beta$ may be calculated without needing to calculate $\theta$ by eliminating $\theta$ from a pair of the expressions for x, y, z.

The calculations and processing may be simplified for particular cases. For an equilateral triangle of side d, $a = \sqrt{3}d/2$ and $b = d/2$, so that the time differences need only be scaled by factors which are independent of d. Alternatively, if m=90 degrees, $a = d_3$ and $b = 0$, so that the quantity R is zero. If $d_1 = d_3$, the scaling factors are again independent of the actual value of the spacing.

An omnidirectional direction-finding system may comprise four receiving elements disposed at the corners of a parallelogram, or more especially a rectangle and more particularly still a square.

The direction of incidence may be calculated from the times of arrival of the earliest-received three signals which are of acceptable quality. This allows for the possibility that signals received at one of the four elements may have been degraded by, for example, an obstruction in the region of the elements.

Comparison of the equations which can be derived from the above two expressions for $\tan \theta$ in terms of x and y and of x and z respectively to relate the error in $\theta$ to errors in x, y and z show that the error is not dependent on which expression is used. The choice of which baselines are considered as primary and secondary baselines for determining $\theta$ is therefore not significant.

As an alternative to a clock common to the timing circuits of all the channels as depicted in FIGS. 1 and 3, each channel may have a respective accurate clock and the clocks be kept in synchronism via a low-bandwidth link. The time measurements and any other other data may be passed to a central processor and control unit via, for example, an optical fibre link.

Figure 6:
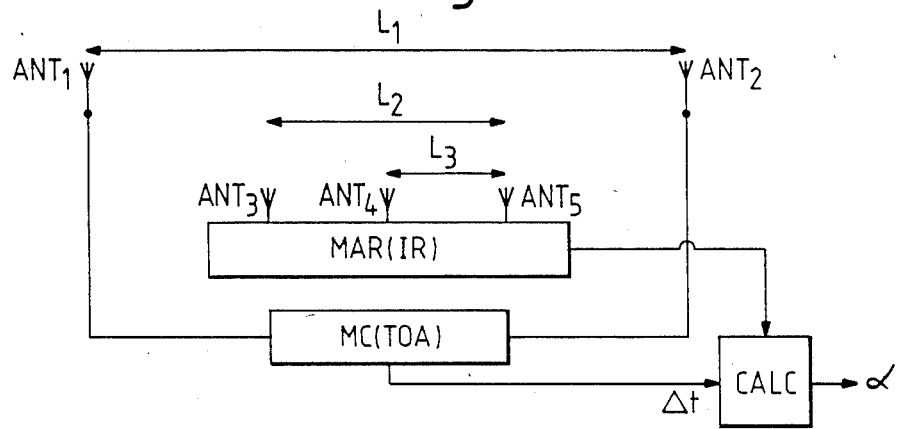
FIG. 6 is a schematic diagram of a simple DF system of a kind using both ToA and phase-difference measurements.

The principle of using both ToA and phase-difference measurements will be explained with reference to FIG. 6. A ToA DF system comprises two antennae $ANT_1$, $ANT_2$ separated by a distance $L_1$, and a measuring and calculating unit MC(TOA) which determines the difference $\Delta t$ between the respective times of arrival of the leading edge of an RF signal at the two antennae. The angle $\alpha$ between the direction of incidence of the signal and the line joining the two antennae (the baseline of the system) is given by the equation $$\cos \alpha = c\Delta t / L_1 \qquad (1)$$

where c is the free-space velocity of electromagnetic waves. An interferometer DF system comprises a rectilinear array of antennae, in this case three antennae $ANT_3$, $ANT_4$, $ANT_5$, so disposed that the line joining the antennae (the baseline of the system) is parallel to and substantially coincident with the baseline of the ToA DF system (in order that the two systems should measure the same angle $\alpha$ in respect of signals from a distant source). The widest-spaced pair of antennae of the interferometer system are separated by a distance $L_2$, and the closest-spaced pair by a distance $L_3$; the accuracy with which the angle $\alpha$ can be determined by the interferometer system depends on the value of $L_2$, and the unambiguous range of coverage depends on the value of $L_3$. The interferometer system comprises a measuring and ambiguity resolution unit MAR(IR) which measures on each of a plurality of pairs of the antennae of different respective spacings, from the widest-spaced to the closest-spaced, the phase difference between RF signals received respectively at the two antennae of the pair in this case the phase difference $\phi_{35}$ and $\phi_{45}$ between $ANT_3$ and $ANT_5$ and between $ANT_4$ and $ANT_5$ respectively; the phase measurements may be performed after converting the RF signals to an intermediate frequency (IF). Since the measurement of phase is restricted to a range of $2\pi$, the measured phases $\phi$ are ambiguous. The actual unambiguous phase differences may be denoted $\Phi$ where $$\Phi = \phi + 2k\pi$$

where k is an integer. The unit MAR(IR) in known manner resolves the ambiguity in $\phi_{35}$ as far as possible by reference to $\phi_{45}$ (see for example GB No. 1 337 099). Now $$\cos \alpha = c\Phi_{35}/2\pi f L_2 \qquad (2)$$

and $$\cos \alpha = c\Phi_{45}/2\pi f L_3 \qquad (3)$$

where f is the frequency of the signals and $\Phi_{35}$, $\Phi_{45}$ are the unambiguous phases. The unambiguous range of coverage of the interferometer system may be obtained by inserting in equation 3 values of $\Phi_{45}$ separated by $2\pi$.

Combining equations 1 and 3, $$\Phi_{45} = 2\pi f \Delta t\, L_3/L_1 \qquad (4)$$

Now in order satisfactorily to be able to resolve the remaining ambiguity in the measured phases using the direction of incidence determined by the ToA DF system, the range of possible values of the actual difference between the ToAs of signals at $ANT_1$ and $ANT_2$ due to uncertainty in the measured time difference should correspond to a range of $\alpha$ whose magnitude is not greater than the magnitude of the range of $\alpha$ corresponding to the range of $\Phi_{45}$ which can be determined unambiguously from $\phi_{45}$, i.e. $2\pi$. Thus if the uncertainty in $\Delta t$ is $\delta t$, so that the range of possible values of the actual time difference is $\Delta t \pm \delta t$, we obtain from equation 4

$$2\pi \geq 2\pi f\cdot 2\delta t\, L_3/L_1 \qquad (5)$$

or $$L_1/L_3 \geq 2\delta t\, f \qquad (6)$$

Relationship 6 defines the minimum value of the ratio of the ToA system baseline, $L_1$, to the cosest spacing of the interferometer system, $L_3$, which will enable satisfactory ambiguity resolution with a given uncertainty $\delta t$ in the measured time difference, at the highest frequency of operation. (The unambiguous angular coverage of the interferometer system increases as the frequency decreases, whereas the uncertainty in the angle measured by the ToA system is independent of frequency.)

The outputs of units MC(TOA) and MAR(IR) are fed to a calculating unit CALC which compares the value of $\phi_{35}$, in which ambiguity has been resolved as far as possible by reference to $\phi_{45}$, with an approximate but unambiguous value of $\phi_{35}$ derived from $\Delta t$ in accordance with the equation $$\Phi_{35} = 2\pi f \Delta t\, L_2/L_1 \qquad (7)$$

which is obtained by combining equations 1 and 2; the ambiguity is resolved in known manner. A representation of $\alpha$ is then calculated from the accurate value of $\Phi_{35}$ derived from $\phi_{35}$. The accuracy of this value of $\alpha$ is given by differentiating equation 2:

$$\delta\alpha = -c\delta\phi_{35}/(2\pi f L_2 \sin \alpha) \qquad (8)$$

where $\delta\alpha$ is the uncertainty in the calculated value of $\alpha$ and $\delta\phi_{35}$ is the possible error in the measured phase difference $\phi_{35}$.

If, for example, $\delta\phi_{35}$ is 30 degrees and $L_2 = 0.66$ meters, then from equation 8, $\delta\alpha$ is 0.25 degrees at 12 GHz and 0.5 degrees at 6 GHz. If the uncertainty $\delta t$ in the time difference is 2 nanoseconds, and taking $L_3 = 0.33$ meters, then from relationship 6, $L_1$ should be not less than 16 meters for operation up to 12 GHz.

If the frequency of the RF signals is not previously known, the composite ToA/interferometer system should comprise means for measuring the frequency.

Resolution of ambiguity in the interferometer system by reference to the ToA system is particularly simple because both systems determine the direction of incidence with reference to the angle $\alpha$ which define a cone the axis of which is the baseline of the respective system, the baselines of the two systems being parallel and substantially coincident. By contrast, for example, an amplitude-comparison DF system locates the direction of incidence substantially in a plane normal to the plane of the main-beam axes of the antennae, which means that such a system is not readily compatible with an interferometer DF system.

When the composite DF system is required only to determine the direction of incidence of signals from sources on one side of the common baseline, and particularly when sources can be assumed to be substantially in an single plane including the common baseline, calculation of the angle $\alpha$ may be sufficient to locate the direction of incidence. The system may in that case use directional antennae which are relatively insensitive to signals from the other side of the baseline. Where sources lie substantially in said plane but may be on either side of the baseline, omnidirectional antennae being used, this ambiguity may be resolved by comparing the times of arrival of signals at the two antennae of the above-described ToA system and at a third antenna coplanar but not collinear with the first two.

It may be noted from equation 8 above that the accuracy is greatest when $\alpha = 90$ degrees and decreases as $\alpha$ decreases towards zero. It may therefore be desirable to use a second composite system with a common baseline coplanar with but inclined to that of the first system, for example at 90 degrees, to achieve improved accuracy for small values of $\alpha$. Such an arrangement may also be used when the direction of incidence is not restricted to a single plane. It may then be desired to determine the angle $\theta$ and/or the angle $\beta$ where $$\sin \gamma = \sin \theta \cos \theta \quad (9)$$

where $\gamma$ is the angle between the direction of incidence and the normal to one of the common baselines in the plane including the direction of incidence (so that $\gamma = (90 \text{ degrees} - \alpha)$ and $\sin \gamma = \cos \alpha$), $\theta$ is the angle between the direction of incidence projected into the plane of the baselines and the normal to the relevant baseline in that plane, and $\beta$ is the angle between the direction of incidence and the plane of the baselines. Typically, the plane of the baselines is horizontal, so that $\theta$ is bearing and $\beta$ is elevation.

Figure 7:
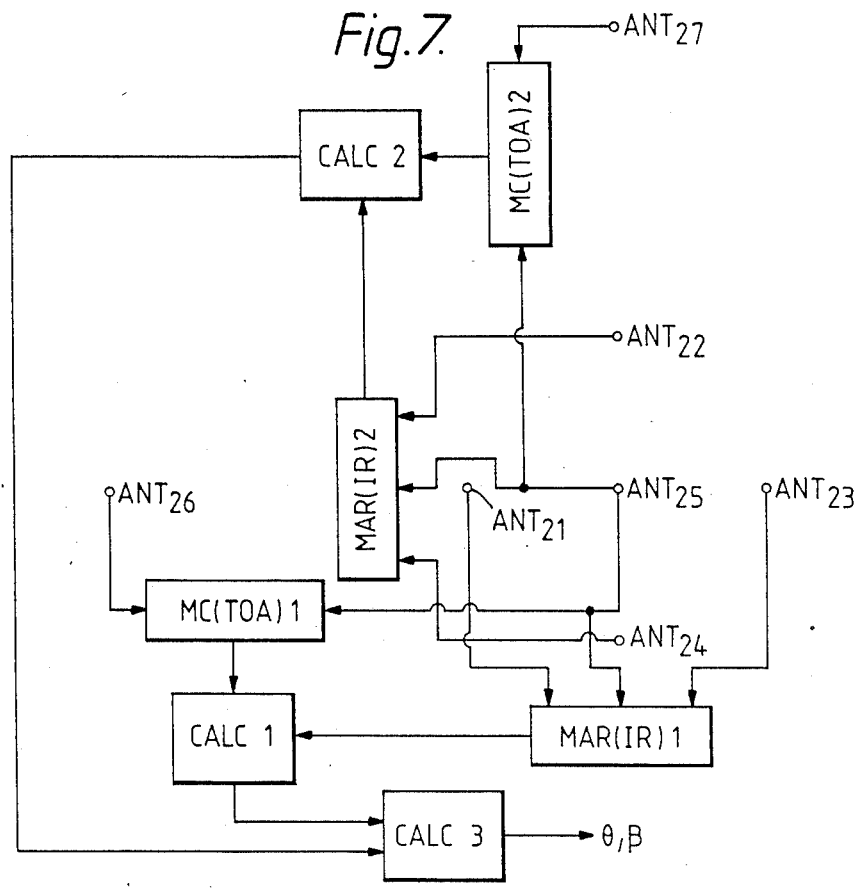
FIG. 7 is a schematic diagram of a particularly simple omnidirectional DF system of this kind.

FIG. 7 is a schematic diagram of a particularly simple omnidirectional DF system using two composite ToA-/interferometer arrangements with coplanar mutually orthogonal common baselines. The system comprises an array of seven antennae $ANT_{21}$–$ANT_{27}$ with omnidirectional responses in the plane of the arrays, as denoted by a circular symbol. Four antennae, $ANT_{21}$–$ANT_{24}$, are located at the corners of a square; a fifth antenna, $ANT_{25}$, is located at the centre of the square, and the remaining antennae, $ANT_{26}$ and $ANT_{27}$, are respectively disposed collinearly with the diagonals of the squares, equidistant from the centre of the square. A first ToA system comprises antennae $ANT_{26}$ and $ANT_{25}$, and the associated first interferometer system comprises antennae $ANT_{21}$, $ANT_{25}$ and $ANT_{23}$. The second ToA system comprises antennae $ANT_{27}$ and $ANT_{25}$, and the associated second interferometer system comprises antennae $ANT_{22}$, $ANT_{25}$ and $ANT_{24}$. The ToA systems comprise respective measurement and calculation units MC(TOA)1, MC(TOA)2 (although the units may be integrated to the extent that only a single ToA measurement is required in respect of antenna $ANT_{25}$), and the interferometer systems comprise respective measurement and ambiguity resolution units MAR(IR)1, MAR(IR)2. The outputs of the associated ToA and interferometer systems are fed to respective calculating units CALC1, CALC2 which in this embodiment only determine the respective unambiguous phase measurements $\Phi_1$, $\Phi_2$, referred to the widest-spaced pair of antennae of the respective interferometer, that represent the angles $\alpha_1$, $\alpha_2$ between the direction of incidence of RF signals and the respective common baseline. Having regard to equations 2 and 9 above, one may write $$\Phi_1 = 2\pi f L_2 \sin \theta \cos \beta / c \quad (10)$$

and analoguously $$\Phi_2 = -2\pi f L_2 \cos \theta \cos \beta / c. \quad (11)$$

Solving these simultaneous equations, one obtains $$\tan \theta = \Phi_1 / \Phi_2 \quad (12)$$

$$\cos \beta = (\Phi_1^2 + \Phi_2^2)^{\frac{1}{2}} (c / 2\pi f L_2). \quad (13)$$

The unabiguous phase angle $\Phi_1$, $\Phi_2$ are supplied to a further calculating unit CALC 3 which calculates $\theta$ and/or $\beta$ in accordance with the above equations.

Figure 8:
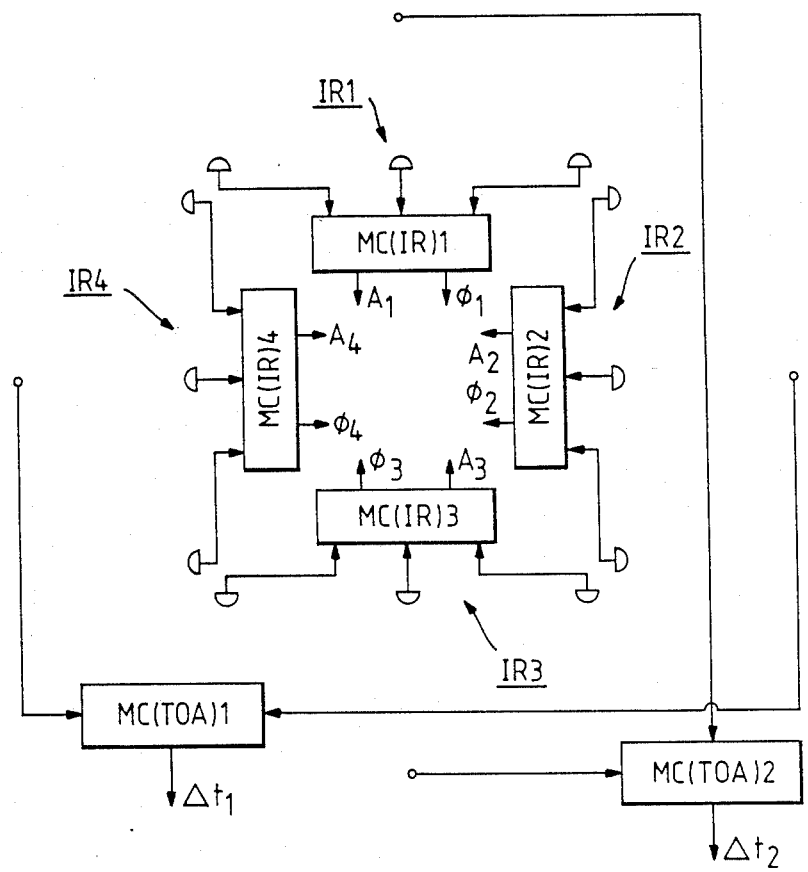
FIG. 8 illustrates the disposition of ToA and interferometer antenna arrays for a more complex omnidirectional DF system of this kind.
Figure 9:
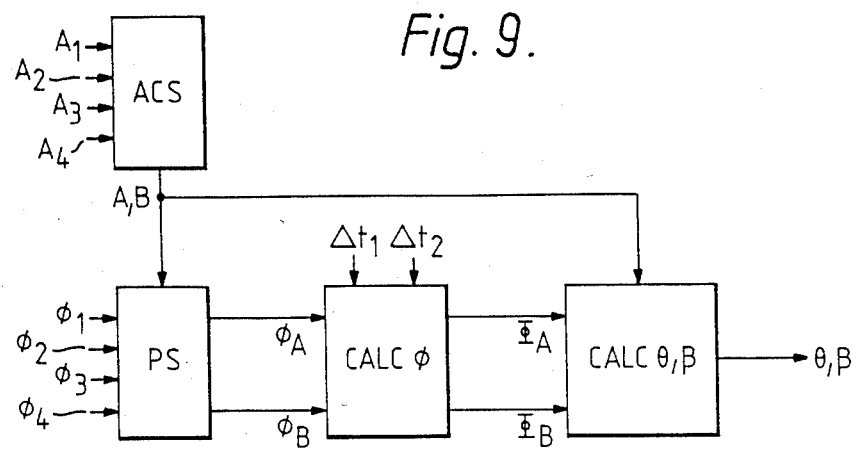
FIG. 9 illustrates processing for a DF system using the arrays of FIG. 8.

While the system of FIG. 7 is particularly simple, it does have the disadvantage that some of the antennae are liable to obstruct signals to others of the antennae when the direction of incidence is at only a small angle ($\beta$) to the plane of the antenna array. This is liable to affect the accuracy of the overall system, since the interferometers are more susceptible to errors due, for example, to multipath. Thus, when the plane is horizontal, the system is best suited to measuring directions of incidence at substantial angles of elevations. FIG. 8 illustrates an alternative antenna arrangement which is better suited for small values of $\beta$ as well as larger values. Omnidirectional coverage is in this case provided by four mutually perpendicular interferometer systems, IR1-IR4, disposed about a common central point and each comprising three uniformly spaced antennae which in this case each have a substantial response over approximately 180 degrees in the plane of the antenna array (as denoted in FIG. 8 by a semicircular symbol). Each of two ToA systems again comprises a pair of omnidirectional antennae which in this embodiment are disposed on opposite sides of the common central point. The respective measurement and ambiguity resolution units of the interferometers, MAR(IR)1-MAR(IR)4, in this embodiment comprise means for measuring the amplitude of the signal received at at least one of the antennae of the respective array. The measured amplitudes, $A_1$–$A_4$, and the ambiguous measured phases, $\phi_1$–$\phi_4$, (in which ambiguity has been resolved as far as possible by reference to the closest-spaced pair of antennae of the interferometer) from the four interferometers, as well as the time differences measured by the two ToA systems, $\Delta t_1$ and $\Delta t_2$, are then processed as will now be described with reference to FIG. 9.

The amplitudes $A_1$–$A_4$ are supplied to an amplitude comparison and selection control unit ACS, and the phases $\phi_1$–$\phi_4$ are fed to a phase selector unit PS. The unit ACS compares the amplitudes and selects for further processing two adjacent interferometers, denoted A and B. At one of these, the amplitude is at least as great as at each of the remaining interferometers, and at the other, the amplitude is at least as great as the amplitude at the other adjacent interferometer; the baselines of interferometers A and B are respectively parallel to those of the first and second ToA systems. The phase selector unit PS accordingly selects the ambiguous phases from those two interferometers, $\phi_A$ and $\phi_B$, and supplies them to a phase calculating unit CALC$\theta$ which also receives the values of $\Delta t_1$ and $\Delta t_2$ measured by the two ToA systems. The unit CALC0 separately resolves the ambiguity in $\phi_A$ and $\phi_B$ by reference to $\Delta t_1$ and $\Delta t_2$ respectively, as explained above with reference to FIG. 1, and produces unambiguous phase angles $\Phi_A$ and $\Phi_B$. These are supplied to a directional angle calculating unit, CALC$\theta$, $\beta$ which also receives an indication of A and B from the unit ACS. The unit CALC$\theta$, $\beta$ calculates the value of $\theta$ and/or $\beta$ as explained above with reference to FIG. 2, also taking into account in calculating $\theta$ which two interferometers the phase measurements have been derived from, so as to add an appropriate integral multiple of 90 degrees.

We claim:

1. A method of determining the direction of incidence of electromagnetic wave signals from a distant source from the time of arrival of the leading edge of the wave signals, wherein the method comprises:

receiving said signals at a plurality of mutually spaced wave-receiving elements, detecting the respective instantaneous amplitude of the signal received at each element, measuring the times at which the detected amplitudes of wave signals received respectively at at least two of said elements first exceed a minimal threshold value such that signals can be satisfactorily distinguished from noise and which is substantially less than the minimum peak value of signals whose direction of incidence is to be determined by said method, the time being measured in such a manner that the measured time is generally unaffected by multipath propagation, determining the difference between the measured times in respect of one pair or of a plurality of pairs of said elements, wherein the two elements of said one pair or of each of at least two of said plurality of pairs are sufficiently close together that the length of the interval of time within which signals from the same source must arrive at the two elements is so short that there is a high probability in operation that no signals from another source will arrive in that interval, and deriving a representation of the direction of incidence from the time difference(s) utilising the relationship $$\cos \alpha = c\delta t/d$$

where $\alpha$ is the angle between the direction of incidence of the signals and the line joining the two elements of a said pair, d is the distance between those two elements, $\delta t$ is the time difference in respect of that pair of elements, and c is the free-space velocity of electromagnetic waves.

2. A method as claimed in claim 1 using three substantially coplanar but substantially non-collinear elements to form at least two said pairs, the method comprising deriving a representation of the angle $\theta$ and/or a representation of the angle $\beta$ utilising the relationship $$\sin (90-\alpha) = \sin \theta \cos \beta$$

in respect of each of said at least two pairs, wherein $\theta$ is the angle between the direction of incidence projected into the plane of the three elements and the normal in said plane to the line joining the two elements of a said pair, and $\beta$ is the angle between the direction of incidence and said plane.

3. A method as claimed in claim 1 which further comprises determining a parameter representative of the rate of increase of the detected amplitude of the respective signal received at at least one of the elements in the region of said threshold value, and determining the direction of incidence of received signals only if said parameter satifies a criterion representing a minimum rate of increase in said region.

4. A method as claimed in claim 3 which comprises measuring the time at which the detected amplitude first exceeds an adjacent further threshold value, wherein said parameter is the difference between the measured times in respect of the two threshold values, and wherein said criterion is that said parameter does not exceed a maximum value.

5. A method as claimed in claim 3 which comprises differentiating the increasing detected amplitude at least in said region, wherein said parameter is the rate of increase in detected amplitude derived by differentiation, and wherein said criterion is that said parameter exceeds a minimum value.

6. A method of determining the direction of incidence of electromagnetic wave signals from a distant source, the method comprising:

receiving said signals at each of a plurality of mutually spaced wave-receiving elements, measuring the phase difference between the signals received respectively at the two elements of one pair of said elements or the respective phase differences between the signals received respectively at the two elements of each of a plurality of substantially collinear pairs of said elements with different respective spacings, wherein the phase measurement on said one pair or on the closest-spaced of said pairs is ambiguous in the operating range of directions o incidence and the operating frequency range, determining by a method as claimed in claim 1 the appropriate direction of incidence of said signals from the times of arrival of the leading edges of corresponding wave signals received respectively at two of said plurality of elements the line joining said two elements is parallel to and substantially coincident with the line joining said one pair or said plurality of substantially collinear pairs, wherein the range of possible values of the actual time difference due to the uncertainty in the difference between the measured times corresponds to a range of angles of incidence whose magnitude is not greater than the magnitude of the range of angles of incidence corresponding to the unambiguous range of phase difference measurement on said one pair or said closest-spaced pair, and resolving the ambiguity in said ambiguous phase measurement by comparing the possible directions represented thereby with the approximate direction determined from the difference between the measured times.

7. A method of determining the direction of incidence of electromagnetic wave signals from a distant source, the method comprising performing a method as claimed in claim 6 in respect of a first pair or a first plurality of substantially collinear pairs of the elements to derive a first unambiguous phase measurement, performing a method as claimed in claim 11 in respect of a second pair or a second plurality of pairs of substantially collinear pairs of the elements to derive a second unambiguous phase measurement, wherein the line joining the elements of said first pair or said first plurality of pairs and the line joining the elements of said second pair or said second plurality of pairs are substantially coplanar and inclined to one another, said first and second phase measurements being representative of the angle α between the direction of incidence and the line joining the elements of the respective pair(s), and deriving a representation of the angle θ and/or a representation of the angle β, where θ is the angle between the direction of incidence projected into the plane of the lines and the normal to a respective one of said lines in said plane and where β is the angle between the direction of incidence and said plane, from the first and second unambiguous phase measurements utilising the relationship $$\sin(90 \text{ degrees} - \alpha) = \sin\theta \cos\beta.$$

8. A system for determining the direction of incidence of electromagnetic wave signals from a distant source from the time of arrival of the leading edge of the wave signals, wherein the system comprises:

plurality of mutually spaced wave-receiving elements, means for detecting the respective instantaneous amplitude of the signal received at each element, means for measuring the times at which the detected amplitudes of wave signals received respectively at at least two of said elements first exceed a minimal threshold value such that signals can be satisfactorily distinguished from noise and which is substantially less than the minimum peak value of signals whose direction of incidence is to be determined by said method, the time being measured in such a manner that the measured time is generally unaffected by multipath propagation, means for determining the difference between the measured times in respect of one pair or of a plurality of pairs of said elements, wherein the two elements of said one pair or of each of at least two of said plurality of pairs are sufficiently close together that the length of the interval of time within which signals from the same source must arrive at the two elements is so short that there is a high probability in operation that no signals from another source will arrive in that interval, and means for deriving a representation of the direction of incidence from the time difference(s) utilising the relationship $$\cos\alpha = c\delta t/d$$

where α is the angle between the direction of incidence of the signals and the line joining the two elements of a said pair, d is the distance between those two elements, δt is the time difference in respect of that pair of elements, and c is the free-space velocity of electromagnetic waves.

9. A system as claimed in claim 8 comprising three substantially coplanar bu substantially non-collinear elements disposed to form at least two said pairs, wherein said means for deriving a representation of the direction of incidence comprises means for deriving a representation of the angle θ and/or a representation of the angle δ utilising the relationship $$\sin(90 - \alpha) = \sin\theta \cos\beta$$

in respect of each of said at least two pairs, wherein θ is the angle between the direction of incidence projected into the plane of the three elements and the normal in said plane to the line joining the two elements of a said pair, and β is the angle between the direction of incidence and said plane.

10. A system as claimed in claim 8 comprising means for determining a parameter representative of the rate of increase of the detected amplitude of the respective signal received at at least one of the elements in the region of said threshold value, and means for inhibiting the determination of the direction of incidence if said parameter does not satisfy a criterion representing a minimum rate of increase in said region.

11. A system as claimed in claim 10 wherein the parameter-determining means comprise means for measuring the time at which the detected amplitude first exceeds an adjacent further threshold value, said parameter being the difference between the measured times in respect of the two threshold values, and said criterion being that said parameter does not exceed a maximum value.

12. A system as claimed in claim 10 wherein the parameter-determining means comprise means for differentiating the increasing detected amplitude at least in said region, said parameter being the rate of increase in detected amplitude derived by differentiation, and said criterion being that said parameter exceeds a minimum value.

13. A system for determining the direction of incidence of electromagnetic wave signals from a distant source, comprising:

a plurality of mutually spaced wave-receiving elements, means for measuring the phase difference between the signals received respectively at the two elements of one pair of said elements or the respective phase differences between the signals received respectively at the two elements of each of a plurality of substantially collinear pairs of said elements with different respective spacings, wherein the phase measurement on said one pair or on the closest-spaced of said pairs is ambiguous in the operating range of directions of incidence and the operating frequency range, means, comprising a system as claimed in claim 6, for determining the approximate direction of incidence of said signals from the times of arrival of the leading edges of corresponding signals received respectively at two of said plurality of elements, the line joining said two elements is parallel to and substantially coincident with the line joining said one pair or said plurality of substantially collinear pairs, wherein the range of possible values of the actual time difference due to the uncertainty in the difference between the measured times corresponds to a range of angles of incidence whose magnitude is not greater than the magnitude of the range of angles of incidence corresponding to the unambiguous range of phase difference measurement on said one pair or said closest-spaced pair, and means for resolving the ambiguity in said ambiguous phase measurement by comparing the possible directions represented thereby with the approximate direction determined from the difference between the measured times.

14. A system as claimed in claim 13 comprising phase-difference measuring means, approximate-direction-determining means and ambiguity-resolving means operable in respect of a first pair or a first plurality of substantially collinear pairs of the elements and of a second pair or a second plurality of substantially collinear pairs of the elements to derive first and second unambiguous phase measurements, wherein the line joining the elements of said first pair or said first plurality of pairs and the line joining the elements of said second pair or said second plurality of pairs are substantially coplanar and inclined to one another, said first and second phase measurements being representative of the angle $\alpha$ between the direction of incidence and the line joining the elements of the respective pair(s), and further comprising means for deriving a representation of the angle $\theta$ and/or a representation of the angle $\beta$, where $\theta$ is the angle between the direction of incidence projected into the plane of the lines and the normal to a respective one of said line in said plane and where $\beta$ is the angle between the direction of incidence and said plane, from the first and second unambiguous phase measurements utilising the relationship $$\sin(90 \text{ degrees} - \alpha) = \sin\theta \cos\beta.$$

15. A system as claimed in claim 14 wherein said lines are mutually perpendicular.

16. A system as claimed in claim 14 wherein the approximate-direction-determining means are operable in respect of the times of arrival at a common element and at each of two elements respectively on the two lines.

17. A system as claimed in claim 16 wherein the phase-difference measuring means are operable to measure the phase differences between said common element and each of two elements respectively on the two lines.

18. A system as claimed in claim 14 comprising three or more mutually inclined successively adjacent pairs or plurality of pairs of elements, means for measuring the amplitude of wave signals received at one or more elements of each of said three or more pairs or plurality of pairs, and means for selecting as said first pair or plurality of pairs one of said three or more pairs or plurality of pairs in respect of which the amplitude is at least as great as the amplitude in respect of each of the remaining pairs or plurality of pairs and as said second pair or plurality of pairs a pair or plurality of pairs adjacent said first pair or plurality of pairs in respect of which the amplitude is at least as great as the amplitude in respect of any other adjacent pair or plurality of pairs.

19. A system as claimed in claim 18 comprising four mutually orthogonal pairs or plurality of pairs of elements.

20. A timing circuit comprising a clock pulse generator, a tapped delay device having a plurality of n mutually spaced taps, a latch coupled to the delay device for latching any signal on each of the n taps, and a decoding device coupled to the latch for producing a time representation signal from the signal(s) latched from the n taps, characterised in that an input signal to be timed is coupled to the input of the delay device, in that the clock pulse generator is normally operable to clock the latch, in that the circuit comprises inhibiting means responsive to the presence of a signal on at least one of the n taps when the latch is clocked to inhibit further clocking of the latch, and in that the decoding device is operable to produce the time representation signal corresponding to the interval between the time that said input signal reaches the tap nearest the input of the delay device and the preceding clock pulse.

21. A circuit as claimed in claim 20 further comprising a counter for counting the pulses of the clock pulse generator, wherein the inhibiting means are further operable to inhibit further counting of the clock pulses, the outputs of the decoding device and the counter being concatenated.

22. A circuit as claimed in claim 20 or 21 wherein the period of the clock pulse generator is not substantially less than the time delay between the tap nearest to and the tap furthest from the input of the delay device.

23. A circuit as claimed in claim 22 wherein said period is substantially equal to said time delay.

24. A circuit as claimed in claim 23 wherein the time delay between each adjacent pair of the n taps is the same, being equal to T, and the period of the clock pulse generator is nT.

25. A circuit as claimed in claim 20 wherein the inhibiting means are responsive to the presence of a signal on the tap nearest the input of the delay device when the latch is clocked.

26. A circuit as claimed in claim 20 wherein the decoding device is operable not to produce said time representation unless when the latch is clocked a signal is present on each tap between the input of the delay device and the tap furthest from the input of the delay device on which a signal is present.

27. A method of determining the direction of incidence of electromagnetic wave signals from a distant source from the time of arrival of the leading edge of the wave signals, wherein the method comprises:
receiving said signals at a plurality of mutually spaced wave-receiving elements;
detecting the respective instantaneous amplitude of the signal received at each element;
producing a first signal indicating when the detected amplitude at a first wave-receiving element exceeds a selected threshold value;
producing a second signal indicating when the detected amplitude at a second wave-receiving element exceeds said selected threshold value;
determining from at least the first and second signals at least the time difference between when the detected amplitudes at said first and second wave-receiving elements exceed said threshold value; and
deriving a representation of the direction of incidence from the time difference utilizing the relationship $\cos\alpha = c\delta t/d$ where $\alpha$ is the angle between the direction of incidence of the signals and the line joining the two elements of a said pair, d is the distance between those two elements, $\delta t$ is the time difference in respect of that pair of elements, and c is the free-space velocity of electromagnetic waves.

28. A method of determining the direction of incidence of electromagnetic wave signals from a distant source, the method comprising:
receiving said signals at each of a plurality of mutually spaced wave-receiving elements;
measuring the phase difference between the signals received respectively at the two elements of one pair of said elements or the respective phase differences between the signals received respectively at the two elements of each of a plurality of substantially collinear pairs of said elements with different respective spacings, wherein the phase measurement on said one pair or on the closest-spaced of said pairs is ambiguous in the operating range of directions of incidence and the operating frequency range;

determing the approximate direction of incidence of said signals from the times of arrival of corresponding wave signals received respectively at two of said plurality of elements, the line joining said two elements is parallel to and substantially coincident with the line joining said one pair or said plurality of substantially collinear pairs, wherein the range of possible values of the actual time difference due to the uncertainty in the difference between the measured times corresponds to a range of angles of incidence whose magnitude is not greater than the magnitude of the range of angles of incidence corresponding to the unambiguous range of phase difference measurements on said one pair or said closest-spaced pair; and resolving the ambiguity in said ambiguous phase measurement by comparing the possible directions represented thereby with the approximate direction determined from the differences between the measured times.

29. A system for determining the direction of incidence of electromagnetic wave signals from a distant source, comprising:

a plurality of mutually spaced wave-receiving elements;

means for measuring the phase difference between the signals received respectively at the two elements of one pair of said elements or the respective phase differences between the signals received respectively at the two elements of each of a plurality of substantially collinear pairs of said elements with different respective spacings, wherein the phase measurement on said one pair or on the closest-spaced of said pairs is ambiguous in the operating range of directions of incidence and the operating frequency range;

means for determining the approximate direction of incidence of said signals from the times of arrival the corresponding signals received respectively at two of said plurality of elements, the line joining said two elements is parallel to and substantially coincident with the line joining said one pair or said plurality of substantially collinear pairs, wherein the range of possible values of the actual time difference due to the uncertainty in the difference between the measured times correspond to a range of angles of incidence whose magnitude is not greater than the magnitude of range of angles of incidence corresponding to the unambiguous range of phase difference measurement on said one pair or said closest-spaced pair; and means for resolving the ambiguity in said ambiguous phase measurement by comparing the possible directions represented thereby with the approximate directions determined from the difference between the measured times.

* * * * *